United States Patent
Li et al.

(10) Patent No.: US 8,050,279 B2
(45) Date of Patent: Nov. 1, 2011

(54) METHOD FOR ACCESSING INTEGRATED SERVICES BY AN ACCESS NETWORK

(75) Inventors: Qiao Li, Shenzhen (CN); Yue Chang, Shenzhen (CN); Hao Wang, Shenzhen (CN); Jiahong Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1026 days.

(21) Appl. No.: 11/628,601

(22) PCT Filed: Mar. 10, 2006

(86) PCT No.: PCT/CN2006/000365
§ 371 (c)(1),
(2), (4) Date: Oct. 29, 2007

(87) PCT Pub. No.: WO2006/094464
PCT Pub. Date: Sep. 14, 2006

(65) Prior Publication Data
US 2009/0316695 A1    Dec. 24, 2009

(30) Foreign Application Priority Data
Mar. 10, 2005   (CN) .......................... 2005 1 0053683

(51) Int. Cl.
*H04L 12/28* (2006.01)
*H04L 12/56* (2006.01)

(52) U.S. Cl. ................... 370/395.5; 370/401

(58) Field of Classification Search .................. None
See application file for complete search history.

(56) References Cited

U.S. PATENT DOCUMENTS 7,257,121 B2 *   8/2007   Kuhl et al. ................. 370/395.5
7,643,499 B2 *   1/2010   Rajsic .......................... 370/401
(Continued)

FOREIGN PATENT DOCUMENTS
CN          1507230 A         6/2004
(Continued)

OTHER PUBLICATIONS

European Search Report from corresponding International Application No. PCT/CN2006000365 filed Mar. 10, 2006.
(Continued)

*Primary Examiner* — Chirag Shah
*Assistant Examiner* — Minh-Trang Nguyen
(74) *Attorney, Agent, or Firm* — Conley Rose, P.C.; Grant Rodolph

(57) ABSTRACT

The present invention relates to a method for accessing integrated services by an access network, including: establishing at least one Multi-Protocol Label Switching (MPLS) Label Switch Path (LSP) in a broadband access network; MPLS encapsulating at a broadband access node a service to be transmitted, and transmitting the encapsulated service in the broadband access network via the LSP. As MPLS is a technology for providing multi-layered connection, in the embodiments of the present invention, MPLS is utilized as the means for networking of broadband access network and private line passing through the core network, so that the problem faced by the broadband access network serving as the bearer network of integrated services can be solved, the integrated services of video, voice, data and private line (including IP private line, and traditional private lines of ATM (Asynchronous Transfer Mode), TDM (Time Division Multiplexing) and FR (Frame Relay)) can be carried over the broadband access network at a lower cost.

9 Claims, 3 Drawing Sheets

U.S. PATENT DOCUMENTS

| | | | |
|---|---|---|---|
| 2003/0108029 A1 | 6/2003 | Behzadi | |
| 2003/0117950 A1 | 6/2003 | Huang | |
| 2003/0131131 A1* | 7/2003 | Yamada et al. | 709/238 |
| 2004/0044789 A1 | 3/2004 | Angel et al. | |
| 2004/0081203 A1* | 4/2004 | Sodder et al. | 370/469 |
| 2004/0196843 A1* | 10/2004 | Zinin | 370/389 |
| 2004/0223498 A1* | 11/2004 | Sanderson et al. | 370/395.52 |
| 2005/0018605 A1 | 1/2005 | Foote et al. | |

FOREIGN PATENT DOCUMENTS

| | | |
|---|---|---|
| CN | 1513253 A | 7/2004 |
| CN | 1529456 A | 9/2004 |
| CN | 1540999 | 10/2004 |
| WO | WO 03/005648 A2 | 1/2003 |
| WO | WO 2004/004301 A1 | 5/2004 |
| WO | WO 2004/04301 A1 | 5/2004 |
| WO | WO 2004/043013 A | 5/2004 |

OTHER PUBLICATIONS

Sven Ooghe et al., *Impact of the Evolution of the Metropolitan Network on the DSL Access Architecture*, IEEE Communications Magazine, IEEE Service Center Piscataway, US, vol. 41, No. 2, Feb. 2003, pp. 140-145 XP011093004.

Johan Moreels et al.*Multi-Protocol Encapsulation over MPLS*; draft-moreels-multiproto-mpls 01,txt, IETF Standard-Working-Draft, Internet Engineering Task Force, IETF, CH, No. 1, Jun. 2003, XP015004455.

Stewart Bryant Cisco Systems Prayson Pate Overture Networks et al., *PWE3 Architecture*; draft-ietf-pwe3-arch-06.txt; IETF Standard-Working-Draft, Internet Engineering Task Force, IETF, CH, vol. pew3, No. 6, Oct. 2003, XP015025951 p. 5.

Luca Martini et al., *Pseudo Wire Switching*; draft-martini-pwe3-pw-switching-02.txt, IETF Standard-Working-Draft, Internet Engineering Task Force, IETF, CH, No. 2, Feb. 2005, XP015039392.

Y(J) Stein Rad Data Communications: *Pseudowireiner Customer Edge to Customer Edge Emulation*; draft-stein-pwe3-pwce2e-00.txt; IETF Standard-Working-Draft, Internet EngineeringTask Force, IETF, CH, Oct. 20, 2003, XPO15035689 ISSN: 0000-0004, pp. 2-4.

Raahemi B et al; *Metro Ethernet Quality of Services : A Framework for Quality of Services-In Metro Ethernet Networks: The Essential Functional Blocks and Handling of Packets in the Core and at the Provider and Customer Edges*, Alcatel Telecommunications Review, Alcatel, Paris Cedex, FR, Oct. 2004 , XP007010175 ISSN: 1267-7167.

Cavendish D et al. *Operation, Administration, and Maintenance in MPLS Networks*, IEEE Communications Magazine, IEEE Service Center, Piscataway, US, vol. 42, No. 10, Oct. 2004, pp. 91-99, XPOII120081 ISSN: 0163-6804, p. 98, chapter "MPLS Protection and Recovery", pp. 95-97, chapter "MPLS Fault Localization and Management".

Simon Delord Philippe Niger France Telecom Yuichi Ikejiri Yuichiro Wada NTT Communications Deborah Brungard ATT Alain Vedrenne EQU: *PWE3 Applications & DAM Scenarios*; draft-delord-pwe3-oam-applications OO.txt; IETF Standard-Working-Draft, Internet Engineering Task Force, IETF, CH, Feb. 2005, XP015037762_ ISSN: 0000-0004 *.p. 18-19, chapter 7.2.3. Fault Localisation, pp. 19-20, chapter 7.2.4. Performance Management (PM), pp. 16-17, 7.2.1. Connectivity Verification (CV).

Fujitsu: *A Layered Network Architecture and Implementation for Ethernet Services*, [Online Mar. 5, 2004, XP002470461 Retrieved from the Internet: URL:http://www.fujitsu.corR/downloads/TEL/fnc/whitepapers/layered network-wp:pdf> [retrieved on 2008-02-251 chapter "Ethernet Transport Tunnel Manager", pp. 12-13.

Ping Pan (Hammerhead Systems): *Pseudo Wire Protection*; draft-pan-pwe3-protection-Ol.txt; IETF Standard-Working-Draft, Internet Engineering Task Force, IETF, CH, Feb. 2005, XP015039545 ISSN: 0000-0004, chapters 2-5, pp. 2-11.

Seisho Yasukawa Masanori UGA Hisashi Kojima Koji Sugisono NTT Alan Kullberg Netplane Systems Markus Jork AVICI Systems Dimitri PAP: *Extended RSVP-TE for Multicast.LSP Tunnels* <draft-yasukawa-mills-rsvp-multicast-Ol.txt>; draft-yasukawa-mpls-rsvp—multicast-.O1.txt , IETF Standard-Working-Draft, Internet Engineering Task Force, IETF, CH, No. 1, Nov. 2002, XP015005786 ISSN: 0000-0004, chapters 1-9.2, pp. 5-43.

Supplementary Partial European Search Report from European Patent Application 06722024.

Sven Ooghe et al., "Impact of the Evolution of the Metropolitan Network on the DSL Access Architecture" IEEE Communications Magazine, IEEE Service Center, Piscataway, US, vol. 41, No. 2, Feb. 2003, pp. 140-145, XP011093004, ISSN: 0163-6804.

International Search Report from corresponding International Application No. PCT/CN2006/000365, filed Mar. 10, 2006.

Foreign communication from a counterpart application, Chinese application 200510053683.8, Office Action dated Mar. 7, 2008, 6 pages.

Foreign communication from a counterpart application, Chinese application 200510053683.8, Partial English Translation Office Action dated Mar. 7, 2008, 5 pages.

Foreign communication from a counterpart application, India application 3504/KOLNP/2006, Office Action dated Jul. 26, 2010, 2 pages.

Foreign communication from a counterpart application, PCT application PCT/CN2006/000365, English Translation Written Opinion dated Jun. 29, 2006, 3 pages.

Martini (Ed. ), et al., "Encapsulation Methods for Transport of ATM Over MPLS Networks," draft-ietf-pwe3-atmencap-07.txt, Oct. 2004.

Martini (Ed.), et al., "Encapsulation Methods for Transport of Ethernet Frames Over IP/MPLS Networks," draft-ietfpwe3-ethernet-encap-08.txt, Sep. 2004.

Cohn (Ed.), et al., "Migration to Ethernet-Based DSL Aggregation for Architecture and Transport Working Group," DSL Forum Working Text WT-101 Revision 11—Letter Ballot—Feb. 2006.

"Operation & Maintenance Mechanism for MPLS Networks," Series Y: Global Information Infrastructure, Internet Protocol Aspects and Next Generation Networks—Internet Protocol Aspects—Operation, Administration and Maintenance, ITU-T Y.1711 (Feb. 2004).

"Operation & Maintenance Mechanism for MPLS Networks Corrigendum 1," Series Y: Global Information Infrastructure, Internet Protocol Aspects and Next Generation Networks—Internet Protocol Aspects—Operation, Administration and Maintenance, ITU-T Y.1711 Corrigendum 1 (Feb. 2005).

"Operation & Maintenance Mechanism for MPLS Networks Amendment 1—New Function Type Codes," Series Y: Global Information Infrastructure, Internet Protocol Aspects and Next Generation Networks—Internet Protocol Aspects—Operation, Administration and Maintenance, ITU-T Y.1711 Amendment 1 (Oct. 2005).

"Protection Switching for MPLS Networks," Series Y: Global Information Infrastructure, Internet Protocol Aspects and Next Generation Networks—Internet Protocol Aspects—Operation, Administration and Maintenance, ITU-T Y.1720 (Dec. 2006).

"Protection Switching for MPLS Networks Amendment 1," Series Y: Global Information Infrastructure, Internet Protocol Aspects and Next Generation Networks—Internet Protocol Aspects—Operation, Administration and Maintenance, ITU-T Y.1720 Amendment 1 (Feb. 2008).

E. Rosen, et al., "Multiprotocol Label Switching Architecture," RFC 3031, Jan. 2001.

Foreign communication from a counterpart application, European application 06722024.4, Communication of a Notice of Opposition dated Oct. 7, 2010, 32 pages.

L. Martini, et al., "Encapsulation Methods for Transport of Layer 2 Frame Over IP and MPLS Networks," draft-martini-12circuit-encap-mpls-04.txt, Nov. 2001.

L. Jianhua, "Discussion of Using MPLS in V Interface of AN for WT1091," Architecture and Transport Working Group, Feb. 20, 2005, dlsforum2005.053, 4 pages.

P.Van Heuven, et al., "Multiprotocol Label Switching (MPLS)," Multiprotocol Label Switching (MPLS), Wiley Encyclopedia of Telecommuications, vol. 5, 2003, pp. 1590-1601.

S. Bryant (Ed.), et al., "PWE3 Architecture," draft-ietf-pwe3-arch-07.txt, Mar. 2003.

L. Martini (Ed.), et al., "Pseudowire Setup and Maintenance Using LDP," draft-ietf-pwe3-protocol-control-15.txt, Feb. 2005.

M. Begley, "The Public Ethernet—The Next Generation Broadband Access Network," Ericsson Review No. 1, 2004, pp. 52-59.

"Cisco 7600 Series Ethernet Over MPLS," Cisco Systems Technology Brief, Copyright 1992-2001, pp. 1-10.

Printout of a web page of the Internet Archive web site showing that the Cisco 7600 reference was publicly available on the Internet at least since Dec. 25, 2004 in pdf form.

Printout of a web page of the Cisco web site as retrieved by the Internet Archive on Feb. 6, 2004.

L. Martini, et al., "Pseudo Wire Switching," draft-martini-pwe3-pw-switching-02.txt, Feb. 2005.

DSL Forum Policy and Procedures, Revised Oct. 8, 2004 (Aug. 10, 2004).

"Dynamic Service Aware Aggregation of PPP Sessions Over Variable Network Tunnels," U.S. Appl. No. 60/363,236, filed Mar. 11, 2002.

* cited by examiner

METHOD FOR ACCESSING INTEGRATED SERVICES BY AN ACCESS NETWORK

CROSS-REFERENCE TO RELATED APPLICATIONS

The present application is a national stage application of International Application No. PCT/CN2006/000365, filed on Mar. 10, 2006, which claims priority to Chinese Patent Application No. 200510053683.8, filed on Mar. 10, 2005.

FIELD OF THE INVENTION

The present invention relates to the field of network communication technologies, and particularly to a method for accessing integrated services by an access network.

BACKGROUND OF THE INVENTION

Network providers have always been pursuing the implementation methods of carrying services of voice, video, data, private line, etc., over the same network at the same time so as to increase the utilization of network and reduce the costs of investment and operation.

An IP (Internet Protocol) network has the advantages of high efficiency of bandwidth utilization, low price, and high bandwidth, and is open and easy for providing flexible services. With the mass deployment of broadband access network, the IP network gradually becomes the practical platform for carrying integrated services. Providers wish to access voice, video and enterprise private line and the like, besides the originally carried data services, via the broadband access nodes. In addition to IP-based voice and enterprise private line which are newly deployed on the broadband network, some providers also wish to carry the traditional services, such as voice or private lines based on TDM (Time Division Multiplexing), ATM (Asynchronous Transfer Mode), or FR (Frame Relay), via the broadband access network.

The existing IP network is mainly designed and constructed for the transmission of data services. The IP network is connectionless and can meet the requirement of the transmission of data services which need only reachability, but can not meet the requirements of reliable transmission (packet loss ratio), time characteristics (order, delay and delay variation), security (isolation between various services, privacy of private network services) and survivability (the recovery time of backup link after failure) for transmission of voice, video and private line interconnection services.

In order to meet the requirement of QoS (quality of service) required by the transmission of voice, video and private line interconnection services, it is necessary for a bearer network to provide connection-oriented service for these services, and protect these services on the basis of connection. To this end, the IP network needs to provide a connection-oriented bearer service.

The MPLS (Multi-Protocol Label Switching) technology is a new technology for providing connection over the IP network. The MPLS technology has been applied to the broadband core network and can provide connection-oriented bearer service. At present, however, the MPLS technology is applied only for the broadband core network; while for an access network, different access approaches are employed to implement the access of different types of services over the access network.

At present, these different types of services are generally transmitted over different independent access networks established respectively for the services of voice, video, data and private lin.

The voice service is accessed by PSTN (Public Switched Telephone Network, the ordinary telephone network using TDM technology). SDH (Synchronous Digital Hierarchy) system is used for the networking of the accessing network;

The data service is accessed by broadband. Direct fiber connection, Ethernet ring (using RSTP (Rapid Spanning Tree Protocol) for protection) or RPR (Resilient Packet Ring) are employed for the networking of the accessing network;;

The video service is accessed by CATV (Cable TeleVision) system. CATV system is employed for the networking of the accessing network;;

The private line service is accessed by DDN (Digital Data Network, which is a private line technology based on TDM), ATM or FR network. SDH system is employed for the networking of the accessing network.

It can be seen that, presently, if a variety of services are to be transmitted, investment for the corresponding network establishment are needed respectively, and the individual networks need to be maintained independently, which increases the provider's CAPEX (Capital Expenditures) and OPEX (Operating Expenditures).

At present, an access network may use the MSTP (Multi-service Transport Platform) system based on SDH, to carry the data, voice and private line altogether.

However, MSTP is a technology based on SDH, with low availability of bandwidth, poor flexibility of services, complex administration and maintenance, and high costs for networking and maintenance.

Another way for implementing integrated service access network is based on ATM, that is, data, voice and private line can be carried together over the ATM network.

However, with the enlargement of IP network, more and more applications have been transplanted to IP platform to make use of its advantages. The ATM network is not the actual development direction of network. It has low efficiency, high cost, and poor expandability, and is difficult to implement whole-network and whole-path coverage when carrying the IP services. ATM is also difficult to implement video multicast services. Furthermore, when ATM network is applied, two kinds of networks based on ATM protocol and IP protocol need to be maintained, thus complicating the administration and maintenance. So, the ATM network can not serve as the integrated service bearer platform for all services covering whole network and whole path in the aspects of bandwidth, scale and tendency, etc.

Presently, the access network based on Ethernet protocol is also employed. That is, the Ethernet technology is applied between a broadband access node and a broadband access server to carry the services of data, voice, video and private line together.

With the Ethernet access network, the access of pure data services can be implemented simply and efficiently at a low cost. However, there are still some issues in the bearing of integrated services.

1. survivability: the Ethernet access network of tree networking can not meet the requirements for service protection. The protection switching time of an Ethernet ring network constructed with RSTP protocol is at the level of seconds, which can not meet the switching time requirements for high quality services.

2. QoS (Quality of Service) and security: the Ethernet forwarding based on MAC (Media Access Control) address learning can not meet the security requirements for the bearing of integrated services, because its forwarding direction is unpredictable, and traffic cannot be isolated completely, and can not meet the QoS requirements for the bearing of integrated services, because bandwidth is hard to be planned.

3. A whole-network and whole-path connection across BAS (Broadband Access Server) or edge router of core network, which ensures a better quality of service for voice and private line, can not be established.

4. The traditional services of TDM, ATM, FR can not be carried, there is no standard method for carrying TDM, ATM, FR across the BAS or the edge router of core network on Ethernet.

Therefore, at present, there is no unified access network which can access all the existing services, such as voice, data, video and private line, etc., at the same time with a low cost.

SUMMARY OF THE INVENTION

In view of the issues described above, an embodiment of the present invention provides a method for accessing integrated services by an access network, thereby integrated services can be transmitted in broadband access network at a low cost.

A method for accessing integrated services by an access network, including:

establishing at least one Multi-Protocol Label Switching (MPLS) Label Switch Path (LSP) in broadband access network;

at a broadband access node, MPLS encapsulating a service to be transmitted and transmitting the encapsulated service in the broadband access network via the LSP.

Preferably, the process of establishing at least one LSP includes: establishing at least one LSP between a broadband access node device and a Broadband Access Server (BAS) in the broadband access network, in which the LSP terminates at the BAS or passes through the BAS;

Preferably, in the process of establishing at least one LSP, the LSP may be established according to different service types and/or quality of service (QoS) provided.

Preferably, in the method, the bandwidth of the access network may be planned and managed on the basis of LSP, and different QoS may be provided and guaranteed for different types of services by use of different LSPs.

Preferably, the established LSP contains one layer of label, the LSP terminates at a Broadband Access Server (BAS) or an edge router of a core network, and the access network distinguishes the QoS of different types of services on the basis of the label.

Preferably, the established LSP contains two layers of label including an outer layer label and an inner layer label, wherein when two layers of a two-layer LSP identified respectively by the two layers of label terminate at a Broadband Server (BAS) or an edge router of a core network simultaneously, the access network distinguishes the QoS of different types of services on the basis of the outer layer label, the broadband access node in the access network, and the BAS or the edge router of the core network identify different services and subscribers on the basis of inner layer label; or, the inner layer label does not provide extra information, and the information of different services and subscribers is provided by payload carried over MPLS.

Preferably, the established LSP contains two layers of label including an outer layer label and an inner layer label, wherein the outer layer LSP identified by the outer layer label terminates at a Broadband Server (BAS) or an edge router of a core network, and the inner layer LSP identified by the inner layer label passes across the BAS or the edge router of the core network and terminates at an MPLS Provider Edge (PE) of the opposite side, the access network distinguishes the QoS of different types of services on the basis of the outer layer label; the broadband access node in the access network, the BAS or the edge router of the core network, and the MPLS PE of the opposite side identify different services and subscribers on the basis of the inner layer label; after the inner layer LSP passes through the BAS or the edge router of the core network, it is encapsulated in another outer layer LSP.

Preferably, the established LSP contains two layers of label including an outer layer label and an inner layer label; wherein when two layers of the two-layer LSP identified respectively by the two layers of label pass through the BAS or the edge router of the core network simultaneously and terminates at an MPLS Provider Edge (PE) of the opposite side, the outer layer label provides a tunnel to the MPLS PE of the opposite side, the access network and the core network distinguish the QoS of different types of services on the basis of the outer layer label; broadband access node and the MPLS PE at two ends of the inner layer LSP identify different services and subscribers on the basis of the inner layer label.

Preferably, in the process of MPLS encapsulating a service to be transmitted and transmitting the encapsulated service, the encapsulation formats for MPLS encapsulation at the broadband access node include the encapsulation formats of Ethernet, Asynchronous Transfer Mode (ATM), Time Division Multiplexing (TDM), Frame Relay (FR) services carried over MPLS; before encapsulating, the method further includes:

when a service is needed to be transmitted by the broadband access network, determining a corresponding LSP for the service at a broadband access node which is the source end of the service.

Preferably, in the process of MPLS encapsulating a service to be transmitted and transmitting the encapsulated service, the LSP for transmission of IP multicast video over the access network is an MPLS multicast LSP.

Preferably, the process of determining a corresponding LSP for the service at a broadband access node which is the source end of the service includes selecting a corresponding LSP for the service according to the type of the service and/or QoS required by the service.

Preferably, the process of determining a corresponding LSP for the service at a broadband access node which is the source end of the service also includes selecting a corresponding LSP for a service according to the subscribers initiating the service.

Preferably, the type of the service include: voice service, data service, video service and private line service.

Preferably, the process of determining a corresponding LSP for the service at a broadband access node which is the source end of the service includes: when Ethernet is carried over MPLS, if a one-layer LSP or a two-layer LSP terminate at a Broadband Access Server (BAS) or an edge router of a core network, selecting a corresponding LSP for the service according to a service tag (S-TAG) of Ethernet packet of the service.

Preferably, the process of determining a corresponding LSP for the service at a broadband access node which is the source end of the service includes: when Ethernet is carried over MPLS, if two layers of label are used and at least the inner layer LSP of the two-layer LSP terminates at an MPLS Provider Edge (PE) of the opposite side across a Broadband Access Server (BAS) or an edge router of the core network, selecting a corresponding LSP for the service according to a service tag (S-TAG) of Ethernet packet of the service.

Preferably, in the process of determining a corresponding LSP for the service at a broadband access node which is the source end of the service, when services of ATM, TDM or FR are carried over MPLS, two layers of label are used, in which at least the inner layer LSP of two-layer LSP terminates at the MPLS Provider Edge (PE) of the opposite side across a Broadband Access Server (BAS) or an edge router of a core network; corresponding LSPs are selected for respective services according to Virtual Channel Connection (VCC) of ATM packet, Data Link Connection Identifier (DLCI) of FR packet, port of TDM and timeslots in TDM frame of the services; the inner layer LSP terminates at the MPLS PE of the opposite side, implementing private line connection of ATM, TDM or FR.

Preferably, the method also includes:

detecting connectivity state of an LSP by using MPLS Operation And Maintenance (OAM);

protecting an LSP which needs to be protected by using MPLS protection switching.

Preferably, the process of protecting an LSP which needs to be protected by using MPLS protection switching includes: establishing in advance a standby LSP for the LSP which needs to be protected; switching a service to the standby LSP for transmission, when the LSP used by the service is detected to be failed by the function of MPLS OAM.

Preferably, the method also includes: implementing network failure location, and performance monitoring of access network by use of the function of MPLS Operation And Maintenance (OAM).

Preferably, the method also includes: the broadband access node recovering Ethernet frame, ATM packet, FR packet, TDM frame from MPLS messages arriving at the broadband access node, then performing subsequent processing.

Preferably, the process of the broadband access node recovering Ethernet frame, ATM packet, FR packet, TDM frame from MPLS messages arriving the broadband access node and performing subsequent processing also includes: for a downstream MPLS packet which is transmitted over Ethernet private line across Broadband Access Server or edge router of core network, the broadband access node replacing the outer layer S-TAG of Ethernet after de-encapsulating the MPLS packet, so S-TAG can be allocated independently in access networks at both ends.

Preferably, the method also includes: if broadband Access Server (BAS) or edge router of core network is the end point of an LSP entering at a downlink port connected to the broadband access network, identifying services and subscribers by 802.1Q, or 802.1AD, or pseudo-wire label of PWE3 in the MPLS PWE3 packet; BAS or edge router extracting Ethernet packet from the LSP after terminating the LSP; in which if BAS or edge router of core network is an intermediate node of an LSP entering at the downlink port connected to the broadband access network, which is the case for private line across the BAS or the edge router of the core network, the BAS or the edge router should support MPLS exchange of the MPLS packets in the LSP.

It can be seen that, in the embodiments, MPLS is introduced into the broadband access network so as to implement the carrying of integrated services which deploy IP protocol, such as video, voice, data and private line and the like. Also, the traditional private line of ATM, DDN and FR can be carried over the broadband access network. Thus the bandwidth utilization and profit of broad network can be increased, and the CAPEX and OPEX can be reduced compared with the solutions deploying several independent access networks.

With the method according to the embodiments of the present invention, the access network can be conveniently unified in technology with the core network of MPLS, thus reducing the cost for operating, administrating and maintaining the network. In addition, with the function of MPLS OAM and protection switching, fault location and performance monitoring are implemented in the network to decrease the maintenance cost, and the protection switch time of broadband access network can be shortened to the telecommunication level of 50 ms.

Since the IP core network has been MPLSized substantially, the introduction of MPLS into access network will enable the MPLS connection covering whole network and whole path in the IP network. Besides the solution to the problem of broadband access network, the MPLSized access network also gives a route map for the aggregation of data, voice, video of three networks,.

DETAILED DESCRIPTION OF THE EMBODIMENTS

The essence of the present invention lies in the service transmission by use of the MPLS technology over a broadband access network, by which the integrated services of IPized video, voice, data and private line (including IP private line and traditional private lines of ATM, TDM and FR) and the like, can be carried over the access network at a lower cost. MPLS is a technology which can provide multi-layer connection. The problem faced by the broadband access network serving as the bearer network of integrated services can be solved, by taking the MPLS as the means of networking of the broadband access network and private line transmission across the core network.

MPLS OAM and protection switching are applied in the embodiments of the present invention, so that the protection switching time of the broadband access network can meet the requirements of the telecommunication level service.

In addition, because of the label-based forwarding of MPLS, the forwarding path of an MPLS packet (including the forwarding path of a packet after protection switching) can be predicted,. Thus, the isolation between service traffics can be achieved and the privacy of information can be ensured. Furthermore, MPLS makes bandwidth planning possible, thereby the QoS of different services are guaranteed.

In order to implement the method according to an embodiment of the present invention, it is necessary for a broadband access node in a broadband access network to:

1. Support MPLS forwarding at the uplink port. That is, it is needed to add an uplink MPLS interface.

2. Support PWE3 (Pseudo Wire Emulation Edge-to-Edge) forwarding at the uplink port. If the carrying of the IPized MPLS integrated services needs to be supported, Ethernet PWE3 is needed. If the carrying of private line of ATM, TDM, and FR needs to be supported, MPLS PWE3 of ATM, TDM, and FR are needed correspondingly. It is necessary to be conformed with the related standards presented by the PWE3 workgroup of IETF (Internet Engineering Task Force).

The broadband access node described in this context includes broadband access devices at central office (CO) and remote (RT) location under the CO, such as digital subscriber line access multiplexer (DSLAM), Ethernet access device, etc.

Figure 1:
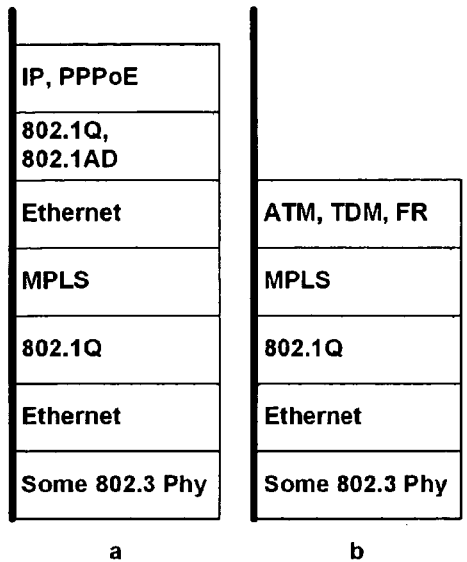
FIG. 1 is a schematic diagram of a protocol stack applied in a broadband access network device.

The protocol stack of an MPLS interface of the broadband access node is shown in FIG. 1, wherein:

FIG. 1*a* shows that the Ethernet frame of an IPized service is carried over MPLS via PWE3, so that integrated services, such as data, VoIP (Voice over IP), and IPTV (IP Television), can be carried between the broadband access node and the broadband access server (BAS) or the edge router of core network; or an end-to-end MPLS connection to MPLS PE (Provider Edge) of the opposite side across the BAS or the edge router of core network, such as Ethernet private line service, can be implemented.

FIG. 1*b* shows that the traditional services of ATM, TDM, and FR are carried over MPLS via PWE3, and an end-to-end private line of ATM, TDM, and FR is formed to the PE device of the opposite side across the BAS or the edge router of core network, getting rid of the independent networks of ATM, DDN, and FR.

The detailed implementation procedure of the method according to the embodiment of the present invention is as follows:

Step 21: multiple LSPs (Label Switching Path) in a broadband access network are established. An LSP may terminate at a BAS device, or pass through the BAS device. That is, the established LSP can be the LSP only between the DSLAM (Digital Subscriber Line Access Multiplexer) and the BAS in the broadband access network, or can be the LSP starting from the DSLAM via the BAS device across the core network.

The LSP includes one layer of Label or two layers of label.

1. When the LSP uses one layer of label, the LSP may terminate at the BAS or the edge router of core network. The label is used by the access network to distinguish the quality of service (QoS) of different types of services.

2. When the LSP uses two layers of label which include an outer layer label and an inner layer label, there may be a variety of application scenarios in practice.

(21). When the two layers of a two-layer LSP identified respectively by the two layers of label terminate at the BAS or the edge router of core network simultaneously, the outer layer label is used by the access network to distinguish the QoS of different types of services, and the inner layer label is used by the broadband access node in the access network and BAS/the edge router of core network to identify different services and subscribers. Optionally, the inner layer label does not provide extra information, and different services and subscribers are identified by the payload carried in the inner layer LSP;

(22). When the outer layer LSP identified by the outer layer label terminates at the BAS or the edge router of core network, and the inner layer LSP identified by the inner layer label passes across the BAS or the edge router of core network and terminates at the provider edge router MPLS PE of the opposite side, the outer layer label is used by the access network to distinguish the QoS of different types of services, and the inner layer label is used by the broadband access node in the access network, the BAS or the edge router of core network, and the MPLS PE of the opposite side to identify different services and subscribers. The inner layer LSP needs to be encapsulated in another outer layer LSP when it enters the core network across the BAS or the edge router of core network (if the opposite side of communication is in this access network, the inner layer LSP returns to this access network);

(23). When the two layers of the two-layer LSP identified respectively by the two layers of label pass across the BAS or the edge router of core network simultaneously and terminate at the MPLS PE of the opposite side, the outer layer label provides a tunnel to the MPLS PE of the opposite side, and is used by the access network and the core network to distinguish the QoS of different types of services, and the inner layer label is used by the broadband access nodes and the MPLS PE to identify different services and subscribers.

The service transmission on the basis of various LSPs described above is handled in the following manners:

When an Ethernet is carried over MPLS, if the LSP established in the manner described in 1, (21) is used, a corresponding LSP can be selected for a service according to the service tag (S-TAG) in the Ethernet packet of the service. At this time, the one-layer LSP or the two-layer LSP terminates at the BAS or the edge router of core network, the LSP which is mapped from the S-TAG can be used to distinguish the QoS of different types of services in the access network. The S-TAG is the outer layer VLAN TAG of the two layers of Virtual Local Area Network Tag (VLAN TAG) defined in IEEE 802.1AD. The S-TAG mentioned in the embodiments of the present invention also includes the one layer VLAN TAG defined in IEEE 802.1Q;

When an Ethernet is carried over MPLS, if the LSP established in the manner described in (22), (23) is employed, a corresponding LSP can be selected for a service according to the service tag (S-TAG) in the Ethernet packet of the service. At this time, the LSP which is mapped from the S-TAG can be used in the access network to distinguish the QoS of different types of services. The outer layer LSP established in the manner described in (23) can also provide a tunnel through the core network to the MPLS PE of the opposite side. After the inner layer LSP which is mapped from the S-TAG terminates at the MPLS PE of the opposite side, the MPLS PE of the opposite side can distinguish different subscribers and services on the basis of the inner layer label, thus an Ethernet private line connection can be implemented between the broadband access node and the PE of the opposite side;

When services of ATM, FR or TDM are carried over MPLS, the LSP established in the manner described in (22), (23) can be used to select the corresponding LSPs for the respective services according to the virtual channel connection (VCC) of an ATM packet, the data link connection identifier (DLCI) of a FR packet, and the port of TDM and the timeslots in a TDM frame. At this time, the outer layer LSP is used by the access network to distinguish the QoS of different types of services, the outer layer LSP established in the manner described in (23) can also provide a tunnel to the MPLS PE of the opposite side through the core network. After the inner layer LSP terminates at the MPLS PE of the opposite side, the MPLS PE of the opposite side can distinguish different subscribers and services on the basis of the inner layer label, thus the private line connection of ATM, FR or TDM can be implemented between the broadband access node and the PE of the opposite side;

Step 22: when the broadband access node needs to transmit a service upward, a corresponding LSP is selected at the source broadband access node of the service according to the type of the service, the quality of service (QoS) and the subscriber information of the service, and then the service is transmitted over the corresponding LSP.

In step 22, the processing procedure of the broadband access node includes the process in the case that the Ethernet frame is carried over MPLS and the process in the case that the ATM/TDM/FR is carried over MPLS, which are described in detail respectively as follows:

1. when the Ethernet frame is carried over MPLS, if an MPLS packet in the broadband access network terminates at the BAS, or terminates at the access aggregation device prior to the BAS, the payload carried in the MPLS packet will identify the services and subscribers by way of 802.1Q or 802.1AD of Ethernet. After the MPLS connection is terminated, the BAS or the device terminating the MPLS packet prior to BAS extracts the payload carried in the MPLS packet directly and identifies the services and subscribers by way of 802.1Q or 802.1AD. At this time, MPLS is only the networking means for carrying the integrated services of the access aggregation layer. Thus, the VLAN plan can be kept the same as of the old network, and the processing of the broadband access node and the BAS can be simplified.

A pseudo-wire is mapped on the basis of the S-TAG for an upstream service on the broadband access node. The S-TAG and pseudo-wire are mapped to each other in the one-to-one map. That is, a corresponding LSP is selected for the upstream service according to the S-TAG of the service traffic, and each S-TAG corresponds to one LSP. After the downstream pseudo-wire sent down to the broadband access node is terminated by the broadband access node, the Ethernet frame is recovered from the MPLS packet. The subsequent processing procedure by the broadband access node is the same as the procedure without MPLS transmission.

For the Ethernet private line across the BAS or the edge router of core network, since the S-TAGs are allocated locally in the access networks, the S-TAGs allocated in the access networks at the two ends of the same private line may be different. Therefore, after the LSP is terminated, it may be needed to replace the outer layer S-TAG, that is, the outer layer S-TAG may be replaced by the actual S-TAG value of the local end access network.

In an embodiment of the present invention, the MPLS label can also be used as the means of access network for identifying the subscribers and services. At this time, the outer layer label of Ethernet PWE3 is used by access layer networking to distinguish the QoS of different type services. The inner layer label is used by the BAS to identify different services and subscribers. At this time, the BAS is needed to be changed correspondingly so as to identify different services and subscribers on the basis of the inner layer label.

2. when the ATM/TDM/FR is carried over MPLS if the ATM/TDM/FR is carried over MPLS, generally, one pseudo-wire starting from the broadband access node and passing across the BAS or the edge router of core network is needed to be established. That is, a private line across the BAS or the edge router of core network is emulated by carrying the traditional services of ATM, TDM and FR over MPLS via PWE3. For an ATM service, it is necessary for the broadband access node to support the ATM exchange, that is, the VPI (Virtual Path Identifier)/VCI (Virtual Circuit Identifier) in the ingress/egress ATM cell is replaced, and the VCC is used to select the pseudo-wire LSP carried in the outer layer LSP of MPLS. The VCC and the pseudo-wire are mapped to each other one to one, that is, one VCC corresponds to one LSP. For a TDM service, the timeslots in TDM frame and the port are used to select the pseudo-wire LSP. For a FR service, DLCI is used to select the pseudo-wire LSP.

In step 22, in addition to the support of MPLS at the uplink port, BAS or edge router of core network also needs to:

1. support MPLS forwarding at the downlink port, and
2. support the related standards of IETF PWE3 workgroup, if the BAS or the edge router of core network is the end point of the corresponding pseudo-wire LSP of Ethernet, ATM, TDM and FR.

If the BAS or the edge router of core network is the end point of LSP entering at the downlink port connected to the broadband access network, 802.1Q or 802.1AD in a PWE3 packet can still be employed to identify the services and subscribers. At this time, after terminating the LSP, the BAS extracts the Ethernet packet from the LSP. Then the processing is the same as the method before the MPLS was introduced. Furthermore, the pseudo-wire labels of PWE3 packets can also be used as identities of the services and subscribers.

When the BAS or the edge router of core network serves as the intermediate node of LSP entering at the downlink port connected to the broadband access network, for the private line across the BAS or the edge router of core network, the BAS or the edge router of core network is required to support MPLS exchange of MPLS packets entering at the downlink port.

The broadband access node, the BAS or the edge router of core network according to the embodiments of the present invention are required to the support MPLS OAM and protection switching, particularly, they are required to:

(1) support the OAM described in ITU-T Y.1711, so as to acquire the connectivity state of each LSP and to know in real time whether each LSP can transmit the services normally;

(2) support the MPLS protection switching described in ITU-T Y.1720. Thus, when a failure is detected by the OAM function showing that the LSP is disconnected, the services carried and transmitted by the LSP are switched onto a standby LSP.

A particular application in an actual network of the present invention will be described below with reference to the accompanying drawings. The access layer networking application, as well as the MPLS connection application over whole network and whole path will be described respectively hereinafter.

Figure 2:
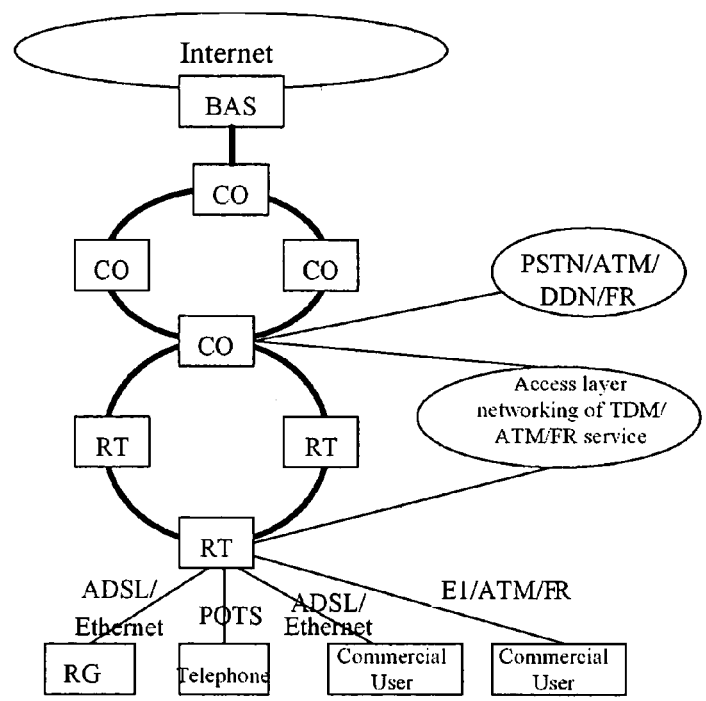
FIG. 2 is a schematic diagram of access layer MPLS networking of IP services.
Figure 3:
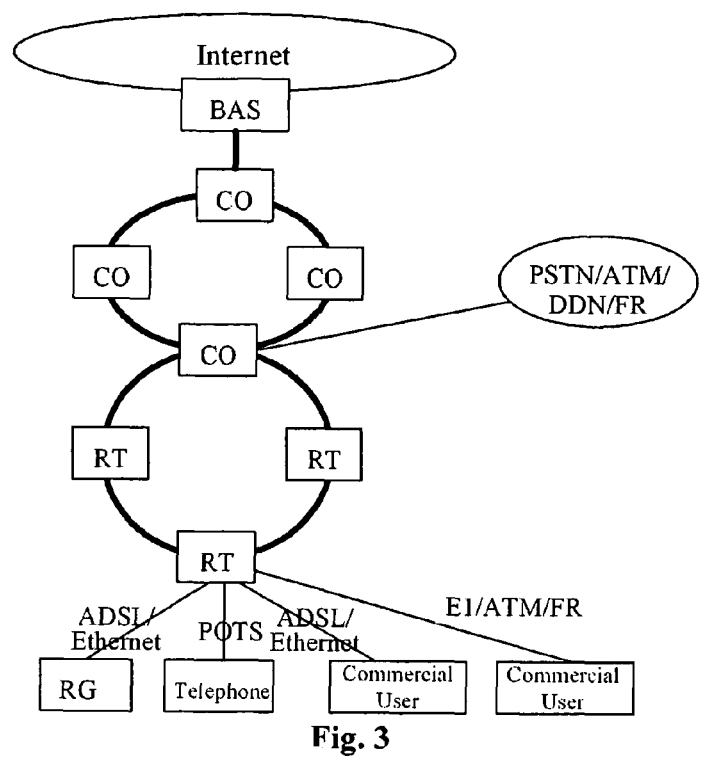
FIG. 3 is a schematic diagram of access layer MPLS networking of integrated services.

The access layer networking application includes the access layer networking of the IPized services and the access layer networking of the integrated services, as shown respectively in FIG. 2 and FIG. 3. The thick solid lines in the figures represent the LSPs of MPLS. CO represents the physical location of a central office; RT represents the physical location of a remote access device below the central offices; The broadband access device (such as DSLAM, Ethernet switch, etc.), the PSTN access device, the ATM access device or the FR access device or the like, can be deployed at the COs and RTs according to the different types of the access services. RG represents the residence gateway of a broadband home subscriber.

As shown in FIG. 2, the IP services are transmitted via the MPLS networking, while the traditional services of ATM, TDM and FR and the like are still accessed to the central offices via other access networks and are then accessed to different core networks. In FIG. 3, the IP services are transmitted via the MPLS networking, the services of ATM, TDM and FR and the like are also carried over MPLS by PWE3; thus, only the MPLS access network is reserved in the broadband access network, and the integrated services can be carried in the MPLS access network; that is, the IP services and the services of ATM, TDM and FR are all transmitted in the broadband access network via LSP.

In FIG. 2, as described above, for the IP services, besides that the MPLS is used for access layer networking, the MPLS label can also be used by the BAS to identify the subscribers and services. MPLS label, instead of VLAN label, can overcome the insufficiencies of space in identifying subscribers and services, and make the service management more flexible.

Figure 4:
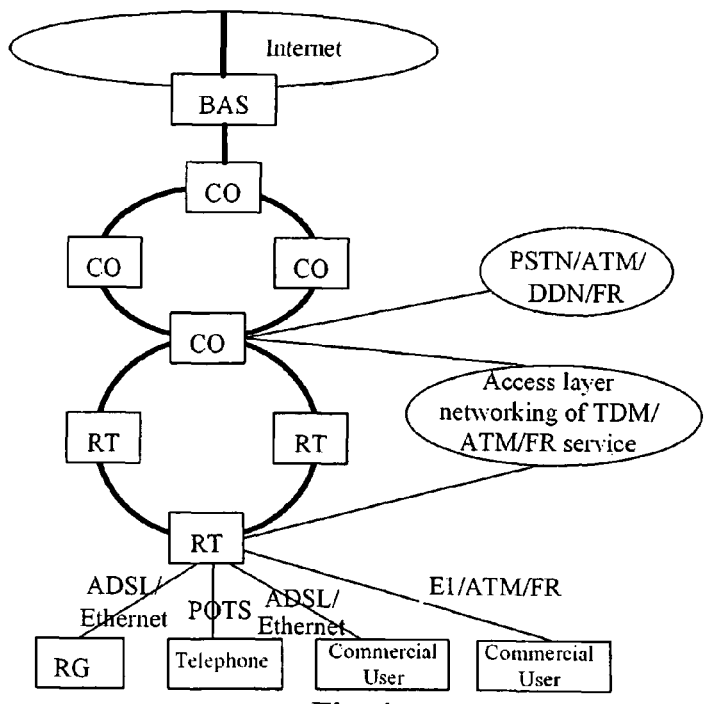
FIG. 4 is a schematic diagram of entire network MPLS connection networking of IP services.
Figure 5:
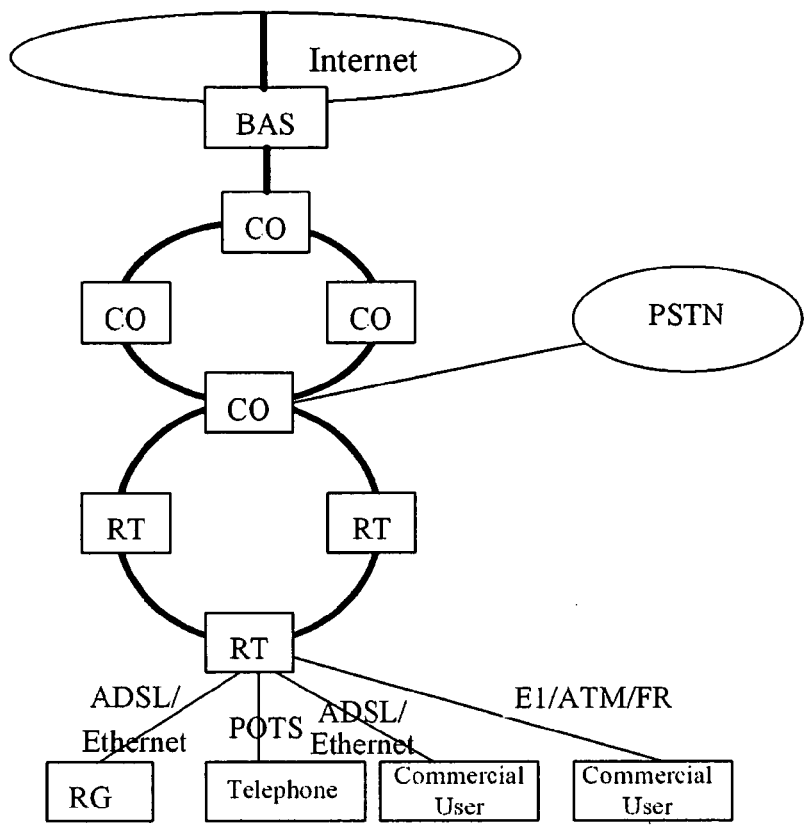
FIG. 5 is a schematic diagram of entire network MPLS connection networking of integrated services.

The entire network MPLS connection can be classified into the entire network MPLS connection of IP service and the entire network MPLS connection of integrated service, as shown respectively in FIG. 4 and FIG. 5. Similarly, the thick solid lines in the figures represent LSPs based on MPLS protocol.

As shown in FIG. 4, for services based on session, VPN (Virtual private network), private line or other service passing across the tunnel of the BAS or the edge router of core network among all the IP services, an Ethernet pseudo-wire passing across the BAS or the edge router of core network may be established to the PE (Provider Edge) of the opposite side through the core network to implement the connection covering whole network and whole path. Accordingly, the QoS, security and survivability can be better ensured by taking the advantages of MPLS.

As shown in FIG. 5, besides that the IP services can establish the PE-to-PE whole-path connection, the statically configured private lines of TDM, ATM and FR can also migrate in whole path to the IP network via PWE3, getting rid of the DDN (Digital Data Network), ATM or FR networks. The PSTN core network is not needed for the call-based voice services until the voice service migrate to VoIP, i.e. until the TDM voice service is IPized in the NGN (Next Generation Network). At this time, the IP network can serve as the unified bearer platform over the entire network.

While the present invention has been illustrated and described with reference to some preferred embodiments, the present invention is not limited to these. Those skilled in the art shall readily recognize that various variations and modifications can be made without departing from the protection scope of the present invention. These variations and modifications shall be encompassed within the protection scope of the present invention as defined by the accompanying claims.

What is claimed is:

1. A method for accessing integrated services by an access network comprising:
  establishing at least one Multi-Protocol Label Switching (MPLS) Label Switch Path (LSP) between a broadband access node device and a Broadband Access Server (BAS) in a broadband access network, wherein the established LSP contains two layers of label comprising an outer layer label and an inner layer label;
  MPLS encapsulating, at the broadband access node, a service to be transmitted, wherein the broadband access node identifies different services and subscribers on the basis of the inner layer label;
  transmitting the encapsulated service in the broadband access network via the LSP, wherein the broadband access network distinguishes a quality Ol service (QoS) of different types of services on the basis of the outer layer label; and
  terminating simultaneously an outer LSP identified by the outer layer label and an inner LSP identified by the inner layer label at either the BAS or an edge router of a core network, wherein the one of the BAS or the edge router where the outer LSP and inner LSP are terminated identifies different services and subscribers on the basis of the inner layer label;
  wherein the broadband access node device is a digital subscriber line access multiplexer (DSLAM);
  wherein before encapsulating, the method further comprises: when Ethernet is carried over MPLS, selecting a corresponding LSP for the service according to a service tag (S-TAG) of Ethernet packet of the service.

2. The method according to claim 1, wherein the bandwidth of the access network is planned and managed on the basis of LSP, and different quality of service (QoS) is provided and guaranteed for different types of services by use of different LSPs.

3. The method according to claim 1, wherein in the process of MPLS encapsulating a service to be transmitted and transmitting the encapsulated service in the broadband access network via the LSP, the LSP for transmission of Internet Protocol (IP) multicast video over the access network is an MPLS multicast LSP.

4. The method according to claim 1, further comprising:
  detecting connectivity state of an LSP by using MPLS Operation And Maintenance (OAM); and
  protecting an LSP which needs to be protected by using MPLS protection switching.

5. The method according to claim 4, wherein the process of protecting an LSP which needs to be protected by using MPLS protection switching comprises:
  establishing in advance a standby LSP for the LSP which needs to be protected; and
  switching a service to the standby LSP for transmission, when the LSP used by the service is detected to be failed by the function of MPLS OAM.

6. The method according to claim 1, further comprising:
  implementing network failure location, and performance monitoring of the access network by use of the function of MPLS Operation And Maintenance (OAM).

7. A method for accessing integrated services by an access network, comprising:
  establishing at least one Multi-Protocol Label Switching (MPLS) Label Switch Path (LSP) between a broadband access node device, and a Broadband Access Server (BAS) in a broadband access network, wherein the established LSP contains two layers Of label comprising an, outer layer label and an inner layer label;
  MPLS encapsulating, at the broadband access node, a service to be transmitted, wherein the broadband access node identifies different services, and subscribers on the basis of the inner layer label;
  transmitting, the encapsulated service in the broadband access network via the LSP, wherein the broadband access network distinguishes a quality of service (QoS) of different type of services on the basis of the outer layer label;
  terminating an outer layer LSP identified by the outer layer label at either the BAS or an edge router of a core network, wherein the BAS or the edge router where the outer layer LSP is terminated identifies different services and subscribers on the basis of the inner layer label;
  passing an inner layer LSP identified by the inner layer label through the BAS or the edge router of the core network where the outer layer LSP is terminated, wherein, the inner layer LSP is encapsulated in another outer layer LSP after the inner layer LSP passes through the one of the BAS and the edge router of the core network; and
  terminating the inner layer LSP at an MPLS Provider Edge (PE) of the opposite side, wherein the MPLS PE of the opposite side identifies different services and subscribers on the basis of the inner layer label;

wherein the broadband access node device is a digital subscriber line access multiplexer (DSLAM);

wherein before encapsulating, the method further comprises: when Ethernet is carried over MPLS, selecting a corresponding LSP for the service according to a service tag (S-TAG) of Ethernet packet of the service.

8. The method according to claim 7, further comprising:

for a downstream MPLS packet which is transmitted over Ethernet private line across Broadband Access Server or edge router of core network, the broadband access node replacing the outer layer S-TAG of Ethernet after de-encapsulating the MPLS packet, so that S-TAG can be allocated independently in access networks at both ends.

9. A method for accessing integrated services by an access network comprising:

establishing at least one Label Switch Path (LSP) between a broadband access node device and a Broadband Access Server (BAS) in a broadband access network, wherein the LSP terminates at the BAS or passes through the BAS;

Multi-Protocol Label Switching (MPLS) encapsulating, at the broadband access node, a service to be transmitted, and transmitting the encapsulated service in the broadband access network via a first LSP;

if the BAS is an end point of a second LSP entering at a downlink port connected to the broadband access network, identifying services and subscribers by 802.1Q, 802.1ad, or pseudo-wire label of Pseudo-Wire Emulation Edge-to-Edge (PWE3) in the MPLS PWE3 packet; and the BAS extracting Ethernet packet from the LSP after terminating the LSP;

wherein if BAS is an intermediate node of a third LSP entering at the downlink port connected to the broadband access network, which is the case for private line across the BAS or the edge router of the core network, the BAS supports MPLS exchange of MPLS packets in the third LSP.

* * * * *